United States Patent [19]

Arvai

[11] 4,182,181
[45] Jan. 8, 1980

[54] PROCESS AND APPARATUS FOR MEASURING THE TEMPERATURE OF A BATH OF MOLTEN METAL

[75] Inventor: Tibor Arvai, Monte Carlo, Monaco

[73] Assignee: "Meci" Materiel Electrique de Controle et Industriel, Plaisir, France

[21] Appl. No.: 925,355

[22] Filed: Jul. 17, 1978

[51] Int. Cl.² ............................................. G01K 1/00
[52] U.S. Cl. .................................................. 73/339 R
[58] Field of Search ............... 73/339 R, 86; 266/99, 266/225, 226, 87, 88

[56] References Cited

U.S. PATENT DOCUMENTS

| | | | |
|---|---|---|---|
| 2,915,305 | 1/1959 | Craig | 73/86 |
| 3,124,771 | 3/1964 | Rohrback | 73/86 |
| 3,610,601 | 10/1971 | Bishop, Jr. | 266/226 |

Primary Examiner—Donald O. Woodiel
Attorney, Agent, or Firm—Pollock, Vande Sande & Priddy

[57] ABSTRACT

A process for measuring the temperature of a bath of molten metal comprises bringing a heat sensitive element into contact with the molten metal whereby the element, which comprises an electrically insulating material is, progressively destroyed by combustion when in contact with the bath. The duration of combustion of a predetermined length of this insulating material is measured, from which duration the temperature of the bath can be ascertained. The duration is timed by means of electrodes immersed within the insulating material, which electrodes terminate at different levels therein and are used to activate or deactivate a counter for counting the pulses of a clock arrangement.

11 Claims, 13 Drawing Figures

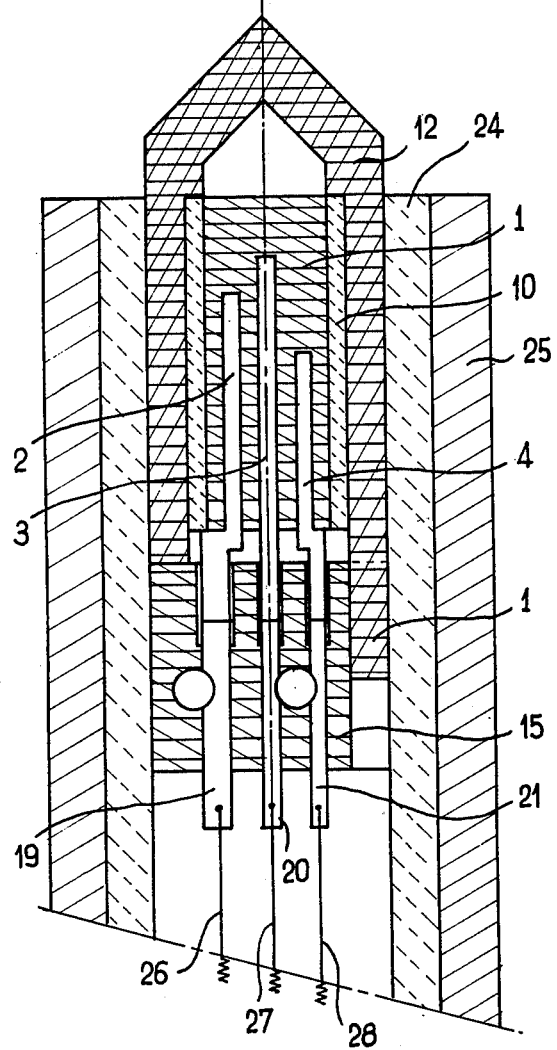
FIG._11
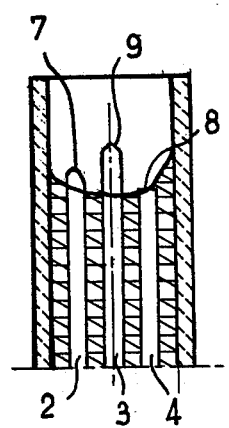
FIG._13

PROCESS AND APPARATUS FOR MEASURING THE TEMPERATURE OF A BATH OF MOLTEN METAL

The present invention relates to a process and apparatus for measuring the temperature of a bath of molten metal.

The invention is particularly adapted for use with a bath of molten steel whose temperature must be measured to determine the activity of oxygen in the bath, as, in order to be able to make use of information supplied by probes which are used to measure the activity of the oxygen, it is, in fact, necessary to know the temperature of the bath at the moment of the probing.

Conventionally, thermocouples are used, which are immersed into the bath or which are incorporated in the wall of the receptacle which contains the bath, or sampling from the bath is used.

These thermocouples have the disadvantage of being relatively expensive, due to the materials from which they are made. Moreover, there is a risk of inaccurate measurement at high temperatures, due to the possible temperature variations in the region of the cold weld of the measuring device.

The object of the present invention is to overcome or substantially mitigate these disadvantages. Additionally, the invention is adapted to use time as a parameter to determine the temperature which makes it possible to use the data processing apparatus in conjunction therewith.

According to a first aspect, the present invention, relates to a process for measuring the temperature of a bath of molten metal, comprising the step of bringing a heat sensitive element into contact with the molten metal, and characterised in the element comprising an electrically insulating material which is progressively destroyed by combustion on contact with the molten metal, whereby the duration of combustion of a predetermined length of the insulating material is measured.

Preferably, at the beginning of the combustion of the said length, a counter is activated, and at the end of the combustion of the said length it is stopped from counting.

The insulating material may be, for example, a polycarbonate.

The counting obtained in this manner hence represents the duration of combustion, and a preliminary calibration is sufficient in order to obtain the desired temperature information.

According to a second aspect, the invention comprises apparatus for use in a process according to the first aspect, including a heat sensitive element which comprises a plurality of electrodes made from an electrically conducting material and immersed in an electrically insulating material, the electrodes being distinct one from another and terminating at different levels in the insulation material whereby the difference in level between the ends of two of the electrodes defines a predetermined length of the insulating material.

The invention will now be described by way of example with reference to the accompanying drawings in which:

FIG. 11 is a longitudinal view of the heat sensitive element housed within the casing, the whole unit being assembled at the end of a rod;

FIG. 13 is a diagrammatic sectional view showing the temperature sensitive element after attack by the bath.

FIGS. 1–7 show a heat sensitive element for use in apparatus according to the present invention for measurement of the temperature of a bath of molten metal by combustion of a predetermined length of insulating material.

The heat sensitive element comprises a plate 1 of electrically insulating material in which three electrodes 2, 3 and 4 made of an electrically conducting material are immersed. The plate 1 can be made, for example, of a insulating material such as a polycarbonate known as DELRIN, whereas the electrodes can be made, for example, of brass or another electrically conducting metal.

In the present example, the three electrodes 2,3 and 4 are straight and parallel within the insulating material.

Figure 1:
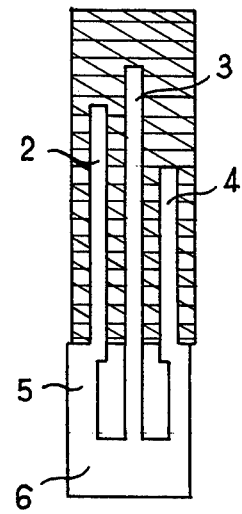
FIG. 1 is a plan view of a heat sensitive element during a stage of its manufacture.

To manufacture this part of the sensitive element industrially, a brass plate 5 (FIG. 1) is cut in such a manner that it has a base to which the three electrodes 2, 3 and 4 are connected to assure their retention in their desired relative positions. The cut out plate 5 is then partially immersed in an insulating material, and subsequently the base 6 is cut away in order to separate the three electrodes 2, 3 and 4.

Figure 3:
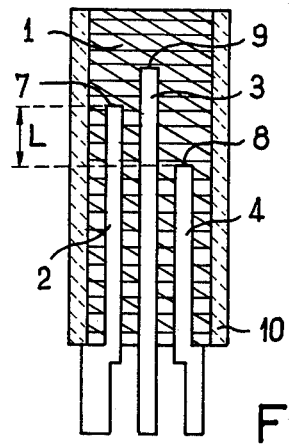
FIG. 3 is a plan of the sensitive element during the course of a subsequent stage of its manufacture.

Either before or after the base 6 is cut away, the plate 5 in which the electrodes 2, 3 and 4 are incorporated, is clad in a casing 10 made from refractory material, for example quartz, as shown in FIG. 3.

The electrodes 2 and 4 are used to define a length of insulating material, that is, the length of material L between the levels of the ends 7 and 8 of the two electrodes. The end 9 of the intermediate electrode 3 is situated beyond the ends 7 and 8, for reasons which will become apparent later on.

Figure 2:
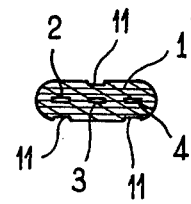
FIG. 2 is a cross section of the element of FIG. 1.
Figure 4:
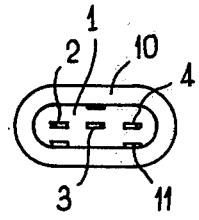
FIG. 4 is a cross section of the element of FIG. 3.

The heat sensitive element as shown in FIG. 2 before being housed in the casing, and in FIG. 4 after being housed in the casing 10, is elongate in cross-section.

Channels 11 are provided between the plate 1 and the casing 10, (FIGS. 2 and 4) to facilitate degassing when the element is used, as will be described below.

Figure 6:
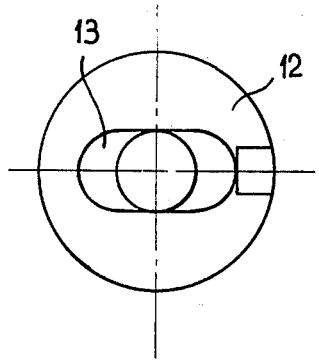
FIG. 6 is a cross section of the component of FIG. 5.
Figure 5:
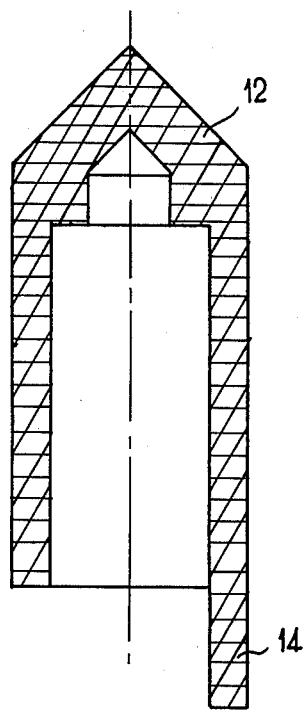
FIG. 5 is a plan view of a second part of the heat sensitive element.

The heat sensitive element as shown in FIG. 3 is introduced into an external casing 12 which is shown in FIGS. 5 and 6.

This external casing 12 consists of a tube, which is closed at one end and can be either cylindrical or conical, and which has a central cavity 13 whose shape corresponds to that of the plate 1 which is enclosed in the casing 10. The assembly formed by the plate 1 and its protective casing 10 is slid into the external casing 12

Figure 7:
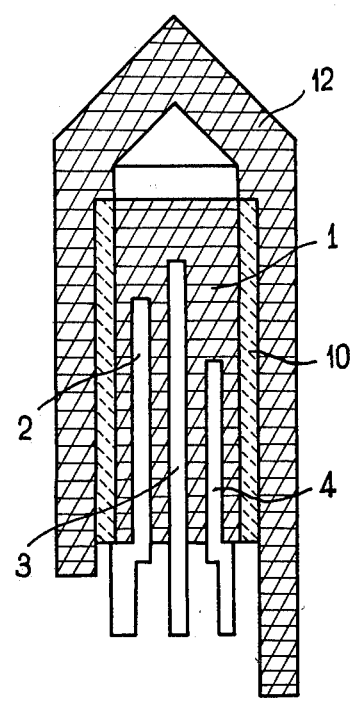
FIG. 7 shows the heat sensitive element comprising the assembly of the second part shown in FIG. 5 and the first part shown in FIG. 3.

(FIG. 7). The external casing 12 is additionally provided with portion 14 which is an extension of the casing 12 at its open end and whose purpose will be explained later.

Figure 9:
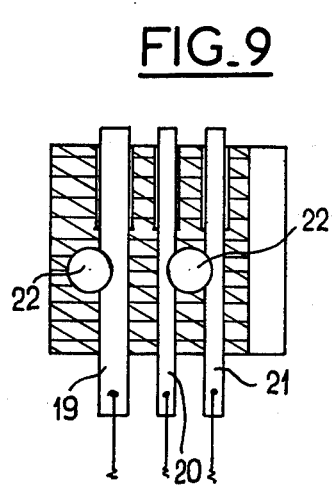
FIG. 9 is a cross section of the casing on the line IX—IX in FIG. 8.
Figure 10:
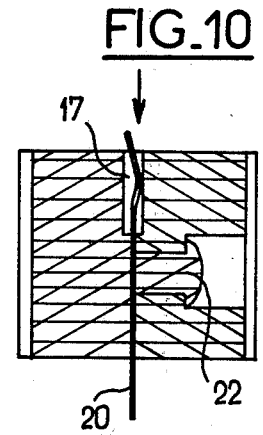
FIG. 10 is a cross section of the casing on the line X—X in FIG. 8.
Figure 8:
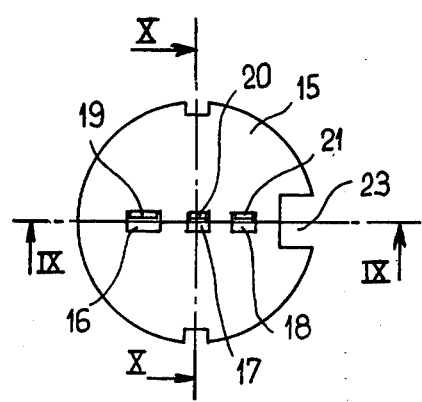
FIG. 8 is a view of a casing for housing the heat sensitive element.

The heat sensitive element assembly formed by the plate 1, its protective casing 10 and its external casing 12 forms a plug-in element which is placed into a plug 15, as shown in FIGS. 8–10.

This plug 15 consists of a cylinder made from an electrically nonconducting refractory material, for example a ceramic, which is crossed by three cavities 16, 17 and 18 which are arranged to correspond to the arrangements of the three electrodes 2, 3 and 4.

Electrical contacts, 19, 20 and 21, which are held by rivets 22, are arranged in these cavities 16, 17 and 18 respectively.

The contacts 19, 20 and 21 consist of plates made from an electrically conducting metal which are curved and spring into the cavities 16, 17 and 18 shown in FIG. 10.

In addition, the plug 15 has a longitudinal cut-away portion 23 whose purpose is to accommodate the extended portion 14 of the external casing 12.

The portion 14 is located in the cut-away portion 23 and pushes the heat sensitive element assembly towards the plug 15 in order to engage the electrodes 2, 3 and 4 in the cavities 16, 17 and 18 respectively where they are wedged against the contacts 19, 20 and 21, respectively as shown in FIG. 11.

This arrangement is then placed in an end of a pipe comprising a refractory sleeve 24 within a cardboard sleeve 25.

It is not necessary to describe in greater detail a pipe of this type which is currently used for immersion of probes into baths of molten metal.

The purpose of the pipe is to hold the heat sensitive element during its immersion into the bath and it protects the conductors, 26,27,28 against the heat and action of the bath. The conductors 26, 27, 28 connect contacts 19, 20 and 21 of the plug 15 to an electrical, electronic or electromechanical apparatus.

Figure 12:
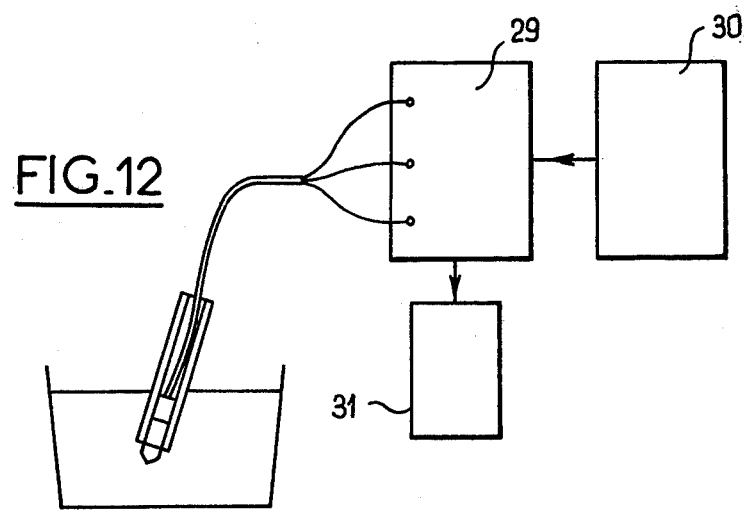
FIG. 12 is a diagram showing the layout of apparatus according to the present invention.

This apparatus could comprise, as shown in FIG. 12, a logic device 29 with gates which control a function connection between a pulse clock 30, which, by means of this device 29, sends its pulses to a counter 31. The counter 31 is returned to zero after each measurement.

When the probe is immersed in a molten metal bath, the external casing 12, which was used to protect the sensitive element, metals and the molten metal contacts the heat sensitive plate 1 which is progressively burned away. This causes, an end 9 of the center electrode 3 to come first of all into contact with the molten metal. As the plate is further destroyed, an end 7 of the electrode 2 comes, in its turn, into contact with the molten metal, and the latter, being electrically conducting, causes a short circuit between the electrodes 7 and 9. This short circuit actuates the device 29 establishing a connection between the clock 30 and the counter 31, which triggers the counting of the pulses of the clock by the counter.

The molten metal in the bath continues to burn the plate 1, and an end 8 of the electrode 4 is in its turn contacted by this metal (FIG. 13). A short circuit is then established between electrodes 8 and 9 and this short circuit causes the device 29 to terminate the signal by interruption of the connection between the clock 30 and the counter 31, which brings about the stoppage of the counting.

The number displayed by the counter hence represents the duration of combustion, which itself is representative of the temperature of the bath.

What is claimed is:

1. A process for measuring the temperature of a bath of molten metal, comprising the steps of bringing a heat sensitive element into contact with the molten metal, permitting a portion of the element comprising an electrically insulating material to be progressively destroyed by combustion on contact with the molten metal, and measuring the duration of combustion of a predetermined length of the insulating material.

2. A process as claimed in claim 1, in which a counter is activated at the beginning of the combustion of the said length and is stopped from counting at the end of the combustion of the said length.

3. Apparatus for measuring the temperature of a bath of molten metal, comprising a heat sensitive element which comprises a plurality of electrodes made from an electrically conducting material and immersed in an electrically insulating material, the electrodes being distinct one from another and terminating at different levels in the insulating material, whereby the difference in level between the ends of two of the electrodes defines a predetermined length of the insulating material, and comprising means for measuring the duration of combustion of a predetermined length of said insulating material.

4. Apparatus as claimed in claim 3, in which the heat sensitive element comprises first and second electrodes defining the predetermined length of insulating material and a third electrode terminating beyond the first and second electrodes.

5. Apparatus as claimed in claim 3 or 4, in which the electrodes are substantially parallel with one another.

6. Apparatus as claimed in claim 3, in which the heat sensitive elements further comprises a plate made from an electrically insulating material to which the electrodes are joined.

7. Apparatus as claimed in claim 6, in which the heat sensitive element further comprises a casing made from an incombustible material, which casing houses the plate.

8. Apparatus as claimed in claim 7, in which an external casing encloses the casing.

9. Apparatus as claimed in claim 3, in which the heat sensitive element is plugged into a cylindrical plug, the electrodes thereof penetrating into the plug in order to engage electrical contacts.

10. Apparatus as claimed in claim 3, in which a clock for generating pulses is connected to a counter by means of an electrical circuit connected to the electrodes of the heat sensitive element, in such a manner that closure of an electrical circuit between a pair of the electrodes actuates the counter to count the pulses of the clock and closure of an electrical circuit between a different pair of electrodes stops this counting.

11. Apparatus as claimed in claim 10, in which the two pairs of electrodes comprise a joint electrode.

* * * * *